United States Patent [19]

Valestin

[11] Patent Number: 4,462,473
[45] Date of Patent: Jul. 31, 1984

[54] APPARATUS FOR ELECTRONICALLY DETERMINING POSTAGE IN RESPONSE TO WEIGHT

[76] Inventor: James C. Valestin, 718 Briar Farm La., Kirkwood, Mo. 63122

[21] Appl. No.: 407,832

[22] Filed: Aug. 13, 1982

[51] Int. Cl.³ ............... G01G 19/22; G01G 13/14; G06F 15/20
[52] U.S. Cl. .................... 177/25; 177/165; 364/466
[58] Field of Search .......... 364/466; 177/25, 165, 177/DIG. 1, 45, 46

[56] References Cited

U.S. PATENT DOCUMENTS

| | | | |
|---|---|---|---|
| 2,605,965 | 8/1952 | Shepherd | 177/DIG. 1 |
| 3,521,039 | 7/1970 | Susor | 177/25 |
| 3,962,569 | 6/1976 | Loshbough et al. | 177/25 |
| 4,036,316 | 7/1977 | Rock | 177/25 |
| 4,084,242 | 4/1978 | Conti | 177/25 |

*Primary Examiner*—Joseph W. Hartary
*Assistant Examiner*—Patrick W. Foster
*Attorney, Agent, or Firm*—Kalish & Gilster

[57] ABSTRACT

An electronic scale electronically determines postage or shipping rates and displays also actual weight in chosen increments of items weighed by a platform atop an enclosure of the scale. A weight sensor provides an analog signal representing item weight. This signal is converted to a digital signal and provided to a computing circuit having a microprocessor for computing weight and rate signals corresponding to the digital signal. Separate weight and rate displays display total weight digitally and display also the actual cost of shipping or postage. An encoded rate selection device is readily and selectively usable with, and replaceable with respect to, the enclosure allowing the user to select a desired predetermined postage or shipping rate schedule, or structure. This device may be a rate selection card carried upon a front panel of the enclosure or a circuit board received within the enclosure. Detectors decode the rate selection device encoding for computing of weight and rate signals only according to this predetermined schedule.

15 Claims, 11 Drawing Figures

APPARATUS FOR ELECTRONICALLY DETERMINING POSTAGE IN RESPONSE TO WEIGHT

BACKGROUND AND SUMMARY OF THE INVENTION

This invention relates to electronic computing scales of the type utilized for calculating and displaying postage or other shipping rates according to the weight of an item.

To be found within the prior art are many kinds of computing postal scales of an electronic nature incorporating digital circuitry, microprocessors, microcomputers and the like for electronically comparing weight with rate data stored electronically to determine the postage or other shipping charges.

Many of these electronic scales have been very complex, utilizing substantial electronic memory to store the extensive data, rate scales, zone charges and so forth which must be taken into account in determining the ultimate postage, shipping rate or charges, bearing in mind that postage rates may vary not only with weight but also with size, distance sent, and the type of shipment. Thus, there are many classes of mail service, including first class, priority mail, third class, parcel post, book rate and many other specialized rates or services, including the rates of commercial shippers, such as United Parcel Service and express mail services. Because of the many different charges, rates and services, the amount of data to be stored electronically is very substantial and requires the provision of dedicated memory which has been typically realized in the form of preprogrammed digital memory devices.

Various controls and data input may be required for existing electronic scales to allow selection and programming for these various parameters. When complicated control or data entries are required, there is a substantial chance for operator error since the operator must accurately select the proper data, code or other information to be recalled from memory, or key in specialized data, to be correctly processed by electronic computation.

A further serious shortcoming of existing electronic computing postal scales is that they are not readily and easily adjusted for new postage rates, shipping rates or other charges as they may be imposed or may occur.

In this regard, it is typical in the design of such electronic postal scales to use such digital devices as programmable read-only memories (so-called PROM's) which must be removed and replaced by differently programmed devices whenever there is a change in the postage rate, shipping charge, scale or other cost factors which are to be taken into consideration.

Because of the cost and complexity of such prior art devices, they have had to be sold at prices which are typically too high for many small businesses to justify their purchase.

Accordingly, it is an object of the present invention to provide an apparatus for electronically weighing mail and other packages and automatically and accurately determining and displaying the postage or other shipping charges for such items.

It is also an object of the present invention to provide such apparatus for providing accurate digital display of the weight of the item in various possible units of measurement by displaying the units in conveniently interpreted decimal increments of such units.

It is an object of the invention to provide such apparatus for providing automatic display of the cost of shipment of items weighed by the unit in various possible modes of service and rates, including first class mail, priority mail, third class, parcel post, book rate, library rate, international air-letters, express rates and commercial shipping rates, among many others.

A related further object of the invention is the provision of such apparatus which allows easy user selection of the service or category of postage or shipping charge to be displayed without potential for confusion, keying in of improper data, or otherwise introducing operator error.

Yet another object of the invention is to provide such apparatus which permits very easy adjustment or updating of the postage or other shipping rates without necessarily requiring replacement of digital memory devices or similar circuitry.

Another object of the invention is the provision of such apparatus which allows user programming for display of the cost for special shipment services or other specialized rate displays, such as, for example, the display of cost for shipment of parcels to foreign countries by air, sea or other modes of shipment, and for shipment by special shipment services, such as express package shipping companies.

As object of the invention is also to provide such apparatus which will display the cost of postage in conveniently visualized increments of postage so that users of postage stamps, for example, can apply the correct number of stamps without resort to mathematical determination.

Among still other objects of the invention may be noted the provision of such apparatus which prevents a display from being provided until an item is being weighed; which causes indication of an overweight display; which provides signalling of an underweight condition; i.e., if an item is removed after weighing is initiated; and which will tare out the weight of objects, such as trays, packages or the like bearing items to be weighed, which objects are not to be taken into consideration during weighing.

It is yet another object of the invention to provide such apparatus which changes the weight display according to the type of service or category of weighing to be undertaken, e.g., which will automatically change from pounds to ounces to ounces and tenths of ounces, whereby the weight display is always correlated with the rate display.

Among other objects of the invention may be noted the provision of such apparatus which is electronic in character and microprocessor controlled; which utilizes coded logic for the display of shipping or mailing costs; which automatically computes weights regardless of the units of measurement; which provides rate display which is unaffected by extraneous power conditions such as electrical noise and static electricity; and which utilizes electrically nonvolatile memory.

Finally, it is to be noted as being among the objects of the invention the provision of such apparatus which is extremely easy to utilize, requiring minimized interpretation and avoids confusion or misinterpretation so that it may be utilized readily by unskilled personnel with a minimum of possibility for mistake or confusion; and which is of extreme simplicity and consequent low cost.

Briefly, the new electronic scale computes and displays postage or shipping rates and displays also actual weight in chosen increments of items weighed by a platform atop the scale enclosure. A weight sensor provides an analog signal representing item weight. This signal is converted to a digital signal and provided to a computing circuit having a microprocessor for computing weight and rate signals corresponding to the digital signal. Separate weight and rate displays display total weight digitally and display also the actual cost of shipping or postage. An encoded rate selection device is readily and selectively usable with, and replaceable with respect to, said enclosure allowing the user to select a desired predetermined postage or shipping rate schedule, or structure. Detector means decode the rate selection device encoding for computing of weight and rate signals only according to this predetermined schedule.

Other objects and features will be in part apparent and in part pointed out hereinbelow.

BRIEF DESCRIPTION OF THE DRAWINGS

Corresponding reference characters indicate corresponding parts throughout the several views of the drawings.

DESCRIPTION OF THE PREFERRED EMBODIMENTS

Figure 1:
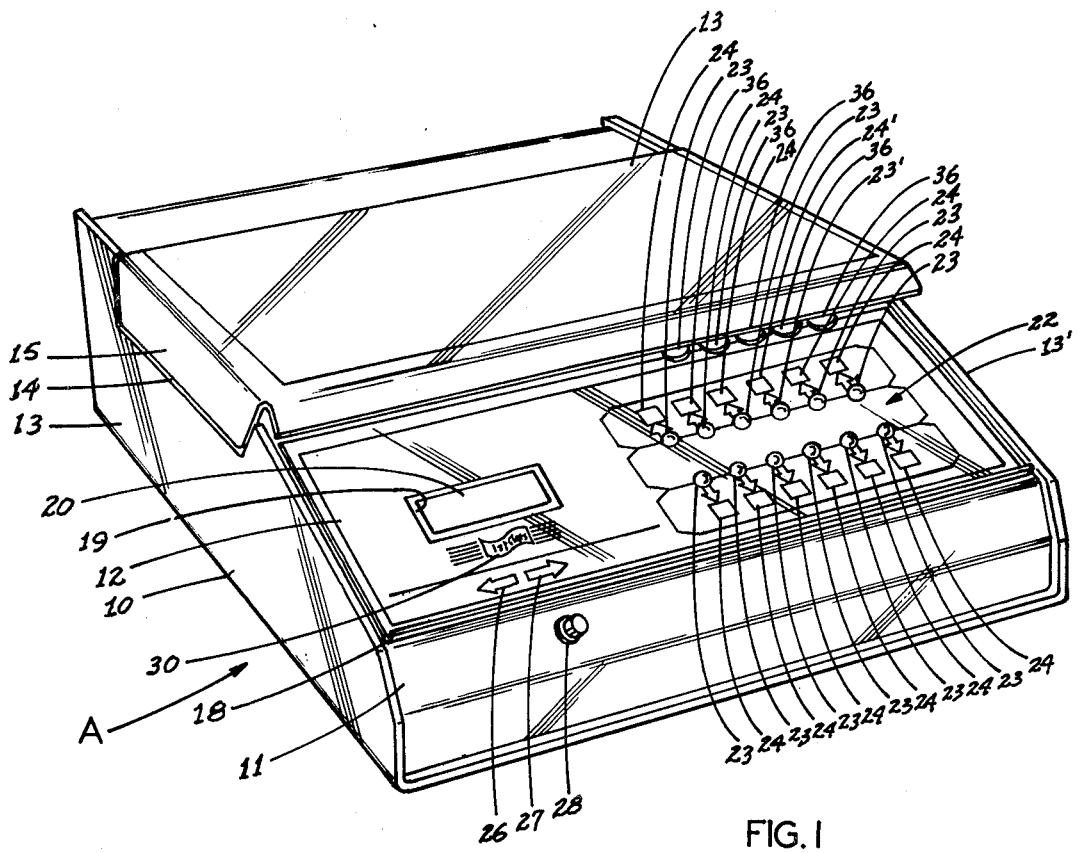
FIG. 1 is a perspective view of apparatus constructed in accordance with and embodying the present invention, as configured according to a first preferred embodiment.

Referring now by reference characters to the drawings, A generally designates a first preferred embodiment of apparatus of the invention utilized for electronically weighing mail and other packages and automatically and accurately determining and displaying postage or other shipping charges for such items.

Apparatus A includes an enclosure 10 having a sloping front panel 11 over the upper portions of which is a so-called logic rate card 12 for displaying postage for packages, mail or other items placed upon a scale tray 13 at the upper end of enclosure 10. A suitable weighing sensor S (FIG. 6) such as a strain gauge or the like, provides a suitable conventional analog signal for computation by logic circuitry of the invention. The circuitry is illustrated in block diagrammatic form in FIG. 6.

Enclosure 10 has opposite sides 13, 13' which may be of metal defining recesses, as at 14, for receiving depending side flanged portions, e.g., 15, of the platform. Each such opening 14 receives the corresponding flanged portion of platform 13 and permits downward movement of platform 13 in response to articles being weighed by apparatus A until the lower peripheral edge of each such depending flanged portion 15 contacts the periphery of the corresponding opening 14, limiting further downward movement of platform 13 to prevent damage to sensor S which otherwise might occur resulting from gross overloading of platform 13.

Logic rate card 12 is one of a series of possible logic rate cards contemplated by the invention and is of a replaceable nature to be readily installed and removed from the sloping front panel, being retained in place by a lip 18 which extends fully along the width of panel 11 for contacting the lower edge of card 12. Each such card 12 may be of relatively thin stock, such as plastic-coated or laminated stock, or instead may be of entirely synthetic character and printed with suitable legends and indicia thereon in accordance with the invention.

In the embodiment depicted in FIG. 1, logic rate card 12 is provided with a rectangular aperture 19 for permitting a weight display 20 to be viewed by the operator. Display 20 may be of the liquid crystal (LCD) type for providing a digital display of the units of weight of items placed upon platform 13.

Also provided is a so-called light matrix generally designated 22 having a plurality of individual lamps or illuminating devices 23 which extend upwardly from the surface of front panel 11 through logic rate card 12. As will be apparent, lamps 22 are arranged in rows and columns to provide, as illustrated, a series of twelve individual lamps forming an array, each adapted to be energized individually and in sequence to indicate postage, as calculated in accordance with the weight of items placed upon platform 13.

Adjacent each lamp 23 in a block or field 24 is printed upon card 12 indicia indicating the appropriate postage corresponding to an increment of weight. Thus, if logic rate card 12 is intended for displaying first class postage, each lamp 23 may indicate an ounce of weight and, in accordance with the invention, each additional ounce of weight of items placed upon platform 13 will cause lamps 23 to sequentially illuminate in accordance with the total number of ounces and fractions of an ounce of such items. Thus, if first class postage is to be displayed, the fourth lamp, designated 23', will illuminate and, assuming present postal rates are maintained, postage of $0.76 will be indicated in the field 24' associated with lamp 23'.

Arrows, lines or other markings may be used to more closely correlate each such lamp 23 with the information to be supplied within block or field 24 upon logic rate card 12.

Also provided on the front panel surface of logic display card 12 is an indicator 26, for indicating over or under range of the capacity of the scale by illumination and an indicator 27 for indicating a condition requiring zeroing or resetting of the scale by depressing a button 28. If, after weighing, items are removed from platform 13, indicator 27 will be illuminated to indicate that the operator should depress button 28 to reset or return the scale to zero condition. Also, if button 28 is depressed while items are on platform 13, the circuitry of apparatus A will be reset to establish a zero reading at display 20. In this regard, button 28 can be used to provide what is termed a tare eliminator or "tare out" command causing the circuitry of apparatus A to disregard the weight of any items upon platform 13. This permits trays or other tares which are not to be weighed to be placed on platform 13 and ignored during the weighing and calculating process.

Each logic rate card 12 may be configured to cause circuitry of apparatus A (FIG. 6) to provide display of units and increments of units of a predetermined measure of weight, such as ounce, tenths and hundredths, within display 20 and to calculate and display the postage thereon by means of the light matrix 22. Card 12 then provides the combined functions not only of front panel postage display but also weight selection whereby, when card 12 is changed, it simultaneously changes both rate selection and weight display. For this purpose, each logic rate card 12 may be uniquely encoded and so marked by the provision of legends, as at 30, upon the front face. Card 12 being designated as applicable for first class postage.

Figure 4:
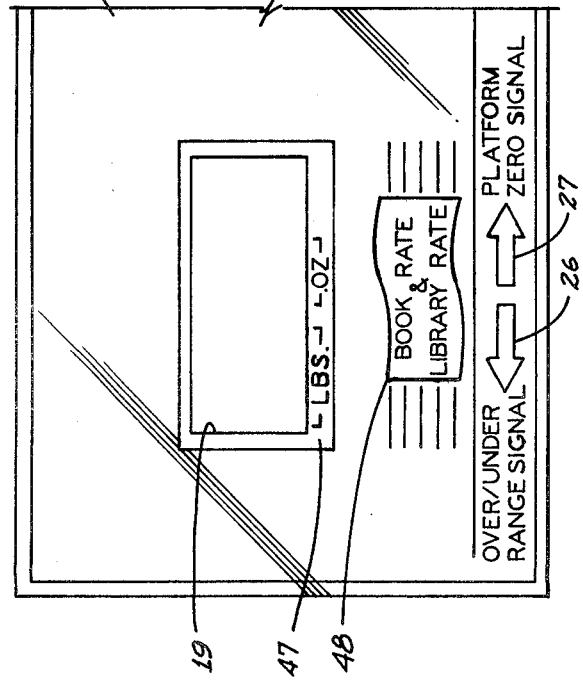
FIG. 4 is a fragmentary illustration of yet another logic rate card of the invention.

Referring to FIG. 4, logic rate card 12 is shown in greater detail. There, it is illustrated that the card is provided with apertures 32 for receiving lamps 23, it being also apparent that the field of information 24 contain the postage corresponding to illumination of the lamp adjacent the respective field. The over range indicator 26 is a suitable aperture or transparent area for being illuminated by light positioned below it, the same being true of the platform zero indicator 27. But, when indicator 27 is illuminated, the operator is signalled to depress the zero button 28.

It is also to be observed that card 12 is provided with indicia at 33 and 34 designating the units of measurement to be provided by the display 20, appearing through opening 19, as determined by the logic circuitry of the apparatus. Accordingly, for first class postage, display 20 may provide a display of ounces (up to a total capacity, for example, of 12 ounces) and 1/10 oz., both in units.

At 35 are indicated bit locations for bit encoding of the card, by the presence or absence of opaque material, such as the card stock or imprinting upon the card to selectively block or permit light to show through the areas 35 for permitting photodetector devices 36 (FIG. 1) to sense the presence or absence of light at each such location 35. Although five such bit locations are shown, fewer or greater in number may be utilized to provide binary encoding of each logic card according to its classification and type of postage. When each such logic rate card is inserted upon the front sloping panel 11 of apparatus A, the bit encoding locations 35, whether light transmissive or light blocking, will align with the detector devices 36.

Figure 2:
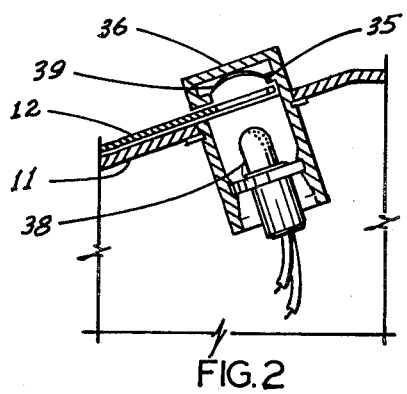
FIG. 2 is a cross-sectional illustration depicting the manner in which so-called logic rate cards of the invention are photoelectronically decoded for rate computation and display purposes.

FIG. 2 demonstrates one device 36 having a light source 38 and suitable means 39 for either detecting or reflecting, for detection, a light transmitted through card 12 through an area 35. Devices 36 are shown schematically also in FIGS. 6 and 7. By binary combination of light blocking or light transmissive character of each location 35 corresponding to 1's and 0's, logic circuitry of the invention will decode the logic card to determine the type of postage, class of service, rate structure or other information needed for the correct calculation of postage and proper display of appropriate units of measurement.

Typical of the logic rate cards which may be utilized by apparatus of the invention are those for calculating postage or rates for the following different services: first class; priority mail; third class; parcel post; book rate; library rate; air letters international; express rates; U.P.S. interstate; U.P.S. blue label and special rates. In addition to the foregoing, various other potential types of service can be calculated, such as private shippers, lock box services, commercial air express shippers, and so forth.

Figure 5B:
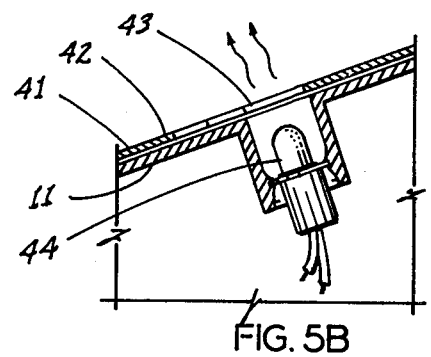
FIG. 5B is a similar cross-sectional illustration depicting yet another manner of display of logic rate card information in accordance with the invention.
Figure 5A:
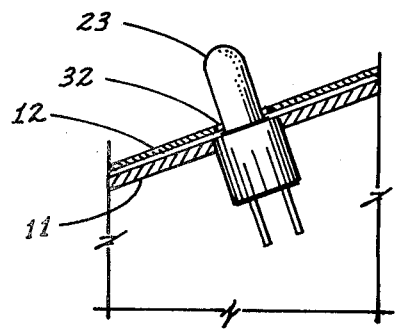
FIG. 5A is a cross-sectional illustration depicting one manner in which logic rate card information is displayed by apparatus of the invention.
Figure 3:
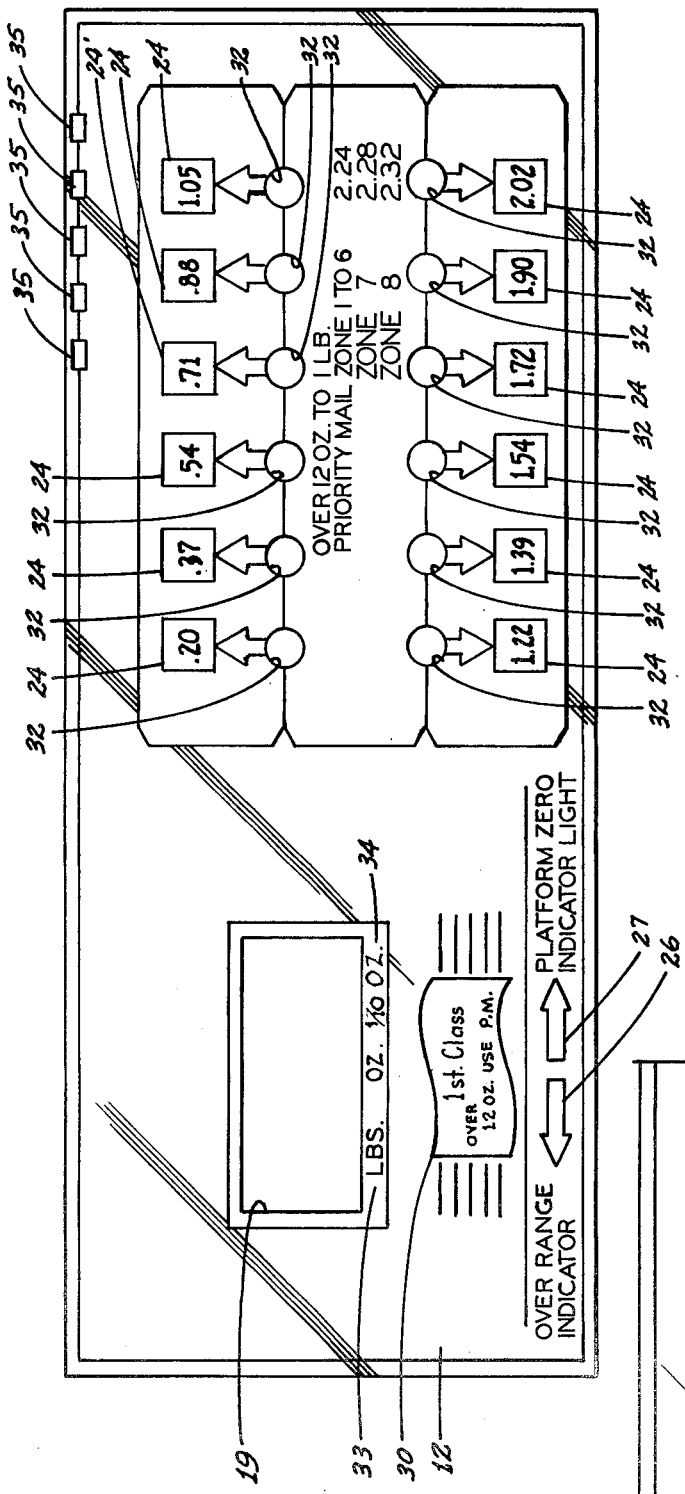
FIG. 3 is a plan view of one version of a logic rate card of the invention.

Each such logic rate card may take various forms for display purposes. Thus, in FIG. 1, card 12 is shown as having apertures 32 through which lamps 23 extend, as shown in FIG. 5A. Alternatively, the logic rate card may be formed of plastic film-like material with photographically reproduced legends thereon to permit light selectively to be shown therethrough, illuminating appropriate legends by back lighting. In FIG. 5B, such a logic rate card 41 has an optically nontransmissive area 42 and a legend area 43 which is light transmissive for permitting light from a lamp 44 to be shown therethrough. Of course, a plurality of such lamps 24 correspond to array 22 to selectively illuminate only one such area 43 at any given time by sequential illumination of the lamps 44 as weight upon platform 13 increases.

FIG. 4 demonstrates salient portions of a logic rate card 46 having adjacent aperture 19 legends 47 for signifying that the display 20 (FIG. 1) figures are representative of pounds, ounces, and tenths of ounces. Appropriate legends, as at 48, signify the service for which postage is to be calculated. Users of apparatus A may conveniently have at hand a number of logic rate cards like that designated 12, each differently marked and differently binary encoded for establishing a different class or service of postage or shipping, etc. By changing the card, the user simultaneously changes not only the front panel display to the new mode desired but also causes rate selection corresponding to the new mode to be simultaneously changed as well.

Figure 6:
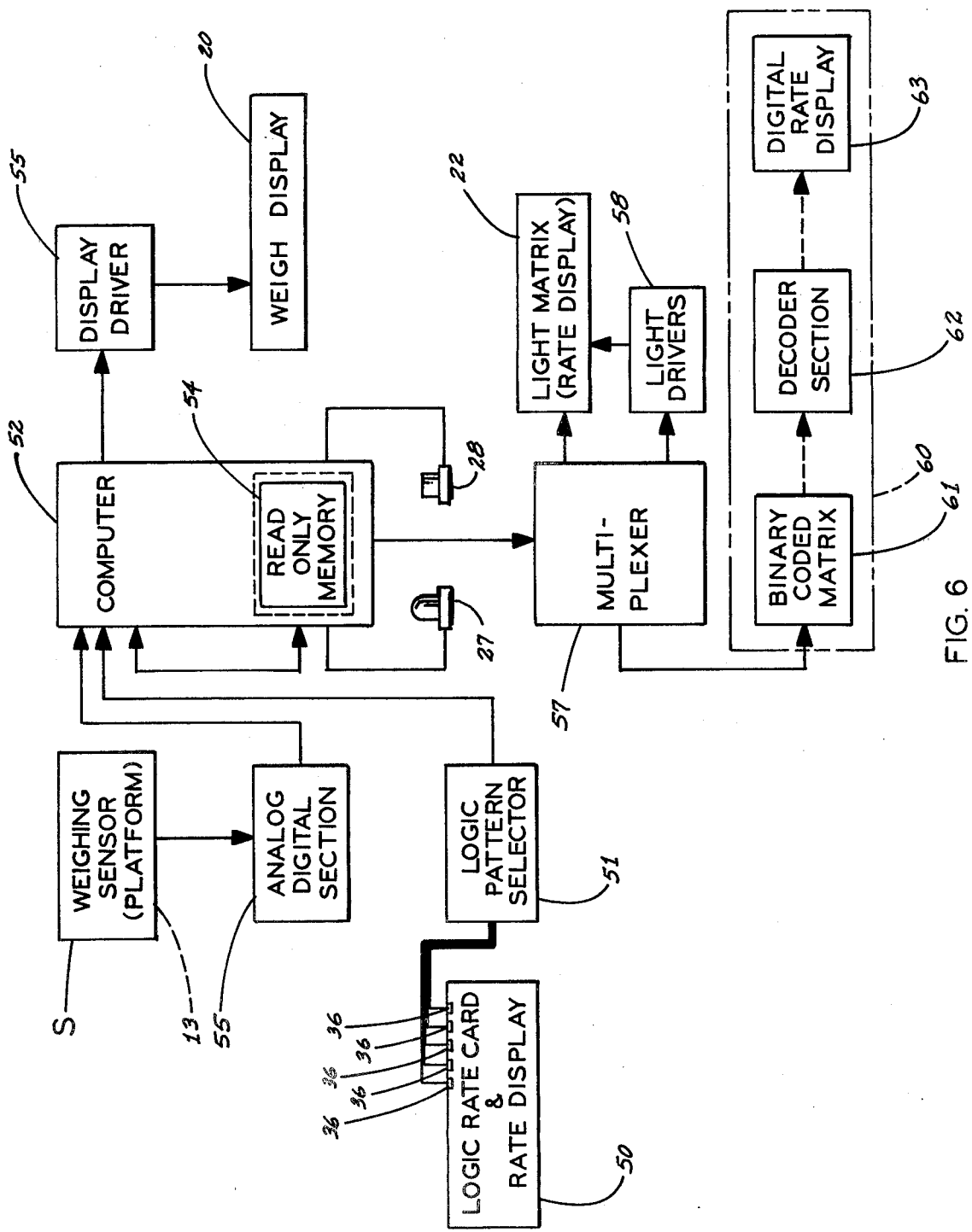
FIG. 6 is a block diagram of circuitry of the apparatus of the invention.

Referring now to FIG. 6, reference character 50 designates any of such various possible rate cards and the rate display capability provided thereon by the light matrix 22. The detector devices 36 cause a logic pattern selector 51 of conventional logic design to provide suitable binary signals to a microprocessor 52 which constitutes a computer which includes a read only memory (ROM) 54 of the programmable type. Microprocessor 52 may be of various commercially available types suitable for the calculation function of the apparatus. The weighing sensor S responds to items upon platform 13, providing an analog signal to an analog-digital conversion section 55 of the circuitry which in turn provides binary-encoded signals proportional to the weight upon platform 13 to microprocessor 52. Microprocessor 52 also provides signals for the zero, or tare out, indicator 27 and is responsive to operation of the zero (tare out) button 28. Signals are provided from microprocessor 52, in response to calculation internally, to a display driver circuit 55 of conventional design for driving the individual digit display of display 20. In this regard, display 20 may be of various possible types, including LED, gas plasma, and so forth.

Microprocessor 52 provides also signals to a multiplexer circuit 57 which determines which of lamps of matrix 22 will be illuminated, the lamps being driven by conventional light drivers 58.

At 60 is indicated a portion of the circuitry which is of an optional character but which may be utilized for attaining a digital rate display. For this purpose, a binary encoded matrix 61 is provided for establishing, in matrix format, data to produce a postage amount for conversion into digital display. Signals from matrix 61 are provided to conventional decoder circuitry 62 and thence to a digital rate display 63 (if utilized) for display of the actual postage or shipping costs applicable to the item weighed upon platform 13. Display 63 is described hereinbelow.

Figure 7:
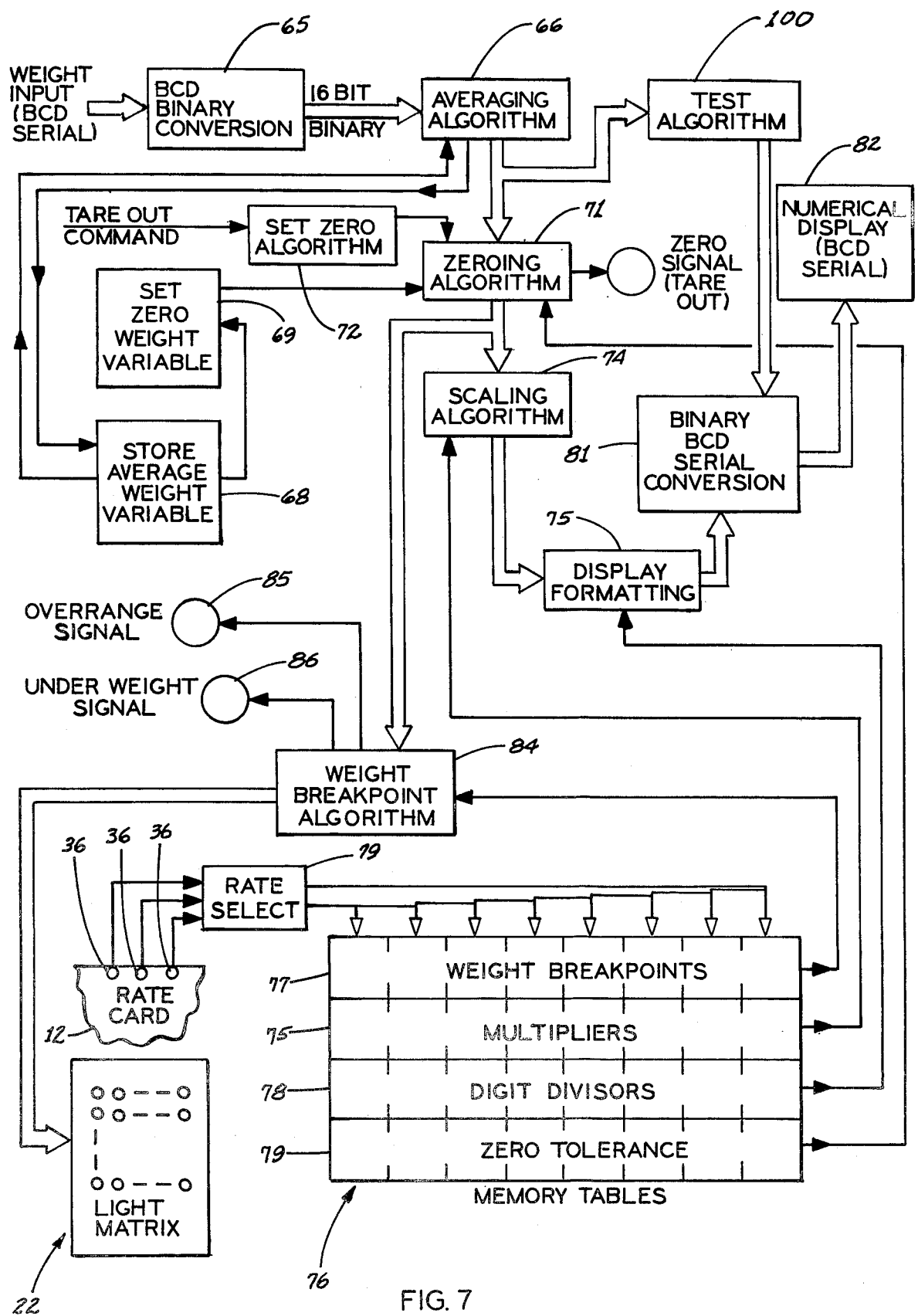
FIG. 7 is a logic flow diagram illustrating the operation of the circuitry of FIG. 6.

Referring now to FIG. 7, the process by which the circuitry of FIG. 6 operates is more clearly revealed. In this regard, conventional programming methodology is utilized to carry out the required functions. Therefore, in the interest of simplicity and describing no more than is necessary to an understanding of the invention such as will enable those skilled in the art to be able to practice the invention, a detailed description of the various ancillary algorithms of the overall computing process will be within the knowledge of those having routine programming skill, and need not be described.

The analog-to-digital circuitry 55 provides weight data in the form of binary coded decimal (BCD), serial format signals to be converted by a BCD binary conversion step 65 which provides a 16-bit binary signal which is used by a microprocessor 52 as the basis for all internal calculations. The data is processed by means of an averaging algorithm 66 for smoothing the data and avoiding jitter. In the course of carrying out the averaging algorithm 66, an average weight variable is stored, as indicated at 68, and utilized to set a zero weight variable by the step indicated 69. The latter step is utilized in carrying out a zeroing algorithm 71 which receives the smoothed data resulting from the averaging algorithm 66.

In carrying out the zeroing algorithm 71, the stored zero weight, realized in step 69, is subtracted from the relative number which constitutes the smoothed weight data obtained by the averaging algorithm 66. The subtraction process provides a biased weight. In carrying out the zeroing algorithm, a set-zero algorithm 72 may be selectively carried out by a tare out command provided by control 28. This causes the zeroing algorithm to reset, thereby establishing a new zero point for the data provided by the averaging algorithm 66.

Following the zeroing algorithm 71, a scaling algorithm 74 is carried out for the purpose of obtaining a display of the weight by display devices 20. For carrying out the scaling algorithm 74, microprocessor 52 fetches information from one of a plurality of different positions of a ROM memory table 75. Indicated generally at 76 are a plurality of such memory tables C, which are resident in ROM 54 of the microprocessor 52. Other tables are designated at 77, 78, and 79. It is seen that the memory tables are organized in blocks, with the block being selected by a rate select step 79 in response to the decoding of the rate card, such as that shown at 12, by devices 36, which may be phototransistors, thereby selecting an appropriate block dependent upon the particular postage rate or schedule which the encoded logic rate card establishes.

For proper display of units and increments of units of measurement, such as pounds, ounces, and 1/10 oz., a multiplier is selected from table 75 during scaling algorithm 74. The date from scaling algorithm 74 then undergoes display formatting, as at 75 (hereinabove described), which takes into consideration digit divisors selected from a table 78 in accordance with the rate selection step 79. The data then undergoes binary-to-BCD serial conversion, as indicated at 81, and is then numerically displayed, as shown at 82, by display 20 (FIG. 6), which requires BCD serial data. In this way, the actual weight of an item upon platform 13 is accurately displayed.

It will be apparent from the foregoing that the multiplier from table 75 determines the scaling of the weight display and, in that way, identifies the least significant digit provided by display 20 corresponding to the binary counts of the 16-bit data provided by averaging algorithm 66. In display formatting step 75, the so-multiplied data is divided back into the 16-bit data producing a count to be divided to obtain a digit for each position of display 20. Thus, for example, if logic rate card 12 calls for a display having as a least significant digit single units of ounces, after the scaling is done, there is obtained a number which corresponds to a multiple of ounces. This binary number is converted during the conversion step 81 to a BCD serial format, to be displayed in step 82.

The zero-relative data provided by algorithm 71 also then is manipulated by a weight breakpoint algorithm 84 taking into consideration certain weight breakpoints established by table 77. These breakpoints determine at what relative values of the data the display by lamp or light matrix 22 will selectively change from one lamp to the next. If twelve lamps 23 are utilized, twelve breakpoints are stored in table 77. Accordingly, in carrying out the weight breakpoint algorithm, it will be seen that the lamps are energized in sequence as the data increases through the intended range of weight data through which the breakpoints are to be established in accordance with the encoded information established by the rate card.

As an example, for a first class rate card (as that designated 12), each breakpoint corresponds to an additional ounce of weight, causing the lamps 23 sequentially to indicate ounce-by-ounce the weight of an item upon platform 13, and with the display advancing in this manner until a single lamp remains illuminated to signal the total postage due in accordance with postal regulations.

In carrying out the weight breakpoint algorithm, the front panel signal 26 is illuminated responsive to an overrange signal 85 to indicate that the total weight of an item upon platform 13 exceeds the postage computation display capability of the apparatus, or an underweight signal 86 (which may produce blinking of signal 26) to signify that the platform 13 is at an underweight condition, i.e., if items have been removed from the platform.

Figure 8:
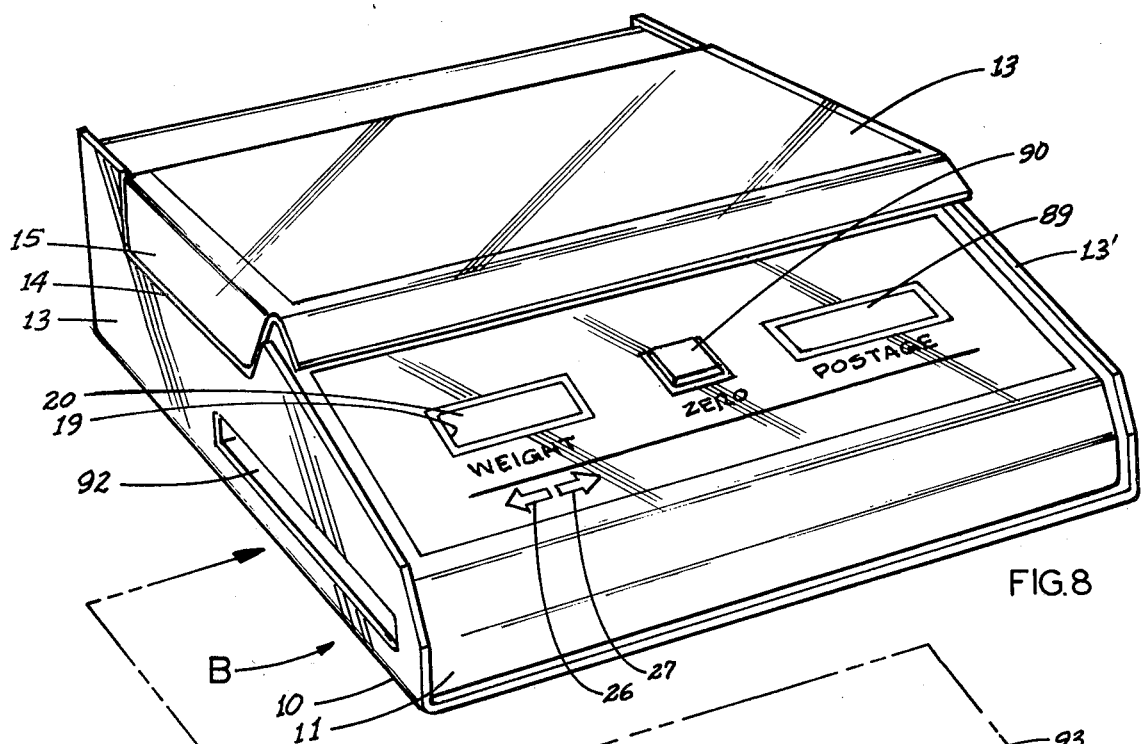
FIG. 8 is a perspective illustration of separated nature, illustrating an alternative embodiment of apparatus of the invention utilizing yet another type of logic rate card utilizing the principles of this invention.
Figure 9:
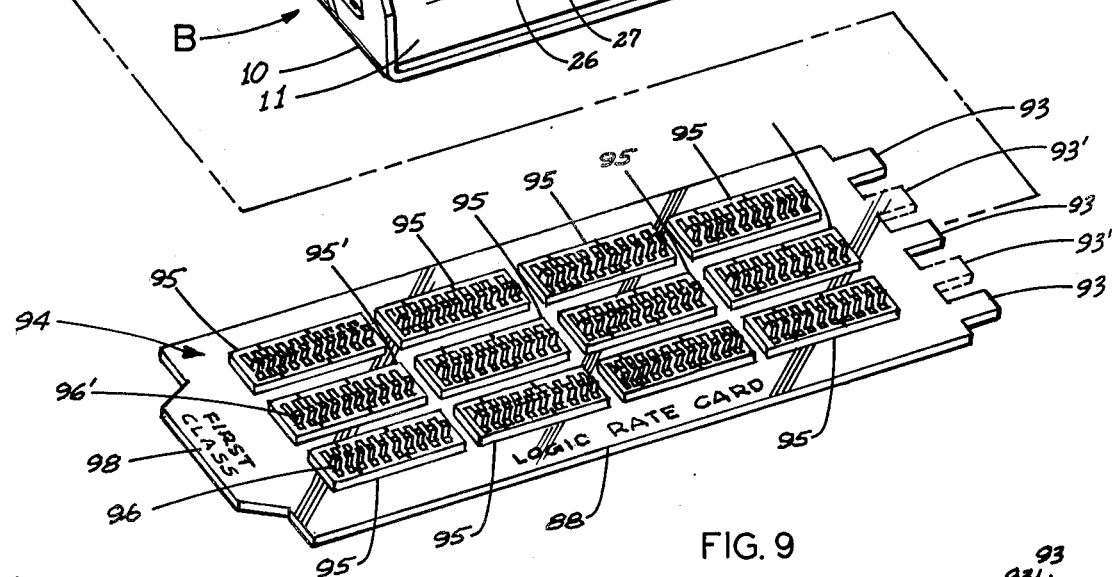
FIG. 9 is a perspective illustration of the logic rate card inserted in the embodiment of FIG. 8.
Figure 10:
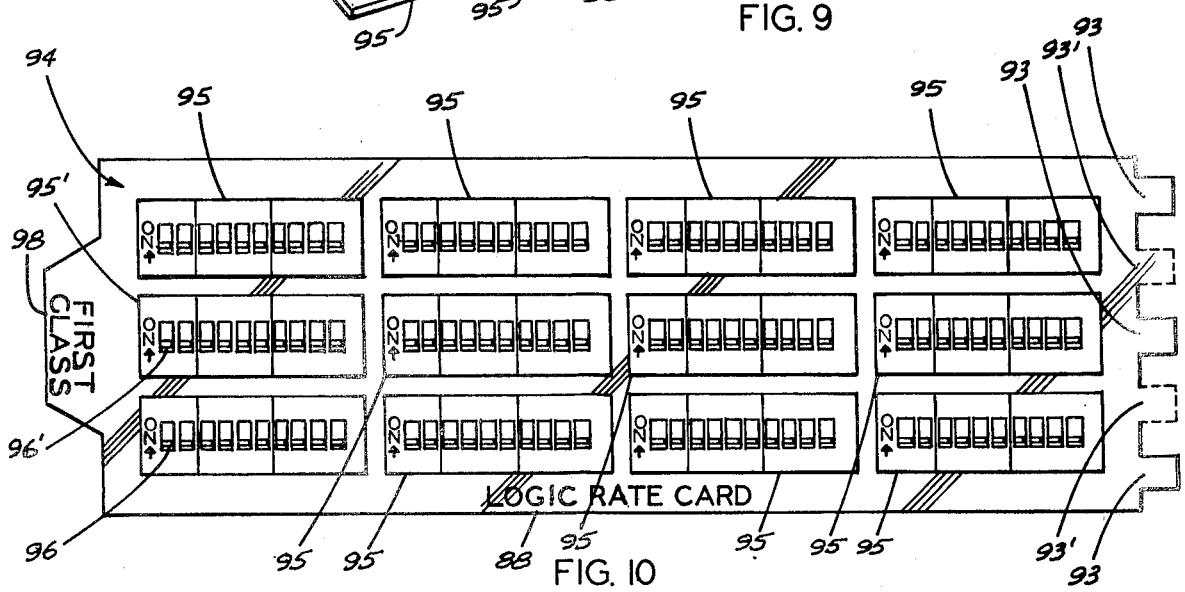
FIG. 10 is a plan view of the logic rate card of FIG. 9.

Referring to FIG. 8, an alternative version of apparatus of the invention is generally designated B. Upon the front panel 11 is the same digital weight display 20, overrange or underrange indicator 26 and zero signal 27. A logic rate card is not positioned upon the front panel 11, but instead takes the form of a printed circuit board 88 by means of which postage is displayed digitally by a display 89. A button 90 is provided for permitting operator zeroing of the display.

Shown provided in one side of enclosure 10 is an opening 92 for receiving the logic rate card in the form of a printed circuit board 88. Circuit board 88 may be one of a number of possible boards in accordance with the class of service or shipping mode to be calculated for cost and for determining the formatting of weight display 20.

For this purpose, each such logic rate card may have a plurality of bit locations 93 and 93' which may take the form of projections or terminals at one end of the circuit board 88 to be decoded by the same type of phototransistor devices 36 as utilized in embodiment A. Thus, the presence or absence of the projections 93, 93' will determine a digital code, as represented by 1's and 0's for determining computation by the circuitry of FIG. 6 in accordance with the process revealed in FIG. 7.

Logic rate card circuit board 88 is provided with a matrix of switch modules, designated generally 94, with each switch module being designated 95 and each being of the commercially available type having a row, as at 96, of tiny switches which may be operator set to establish a binary code of 1's and 0's which will establish a rate for being displayed by rate display 89 as the cost of postage or shipment, as the case may be. Each such switch module 95 takes the place of one of the lamps 23 of matrix 22 and its corresponding field 24 of printed indicia. For example, the switch module designated 95' may represent the fifth ounce of an item being weighed for first class postage and the row of switches 96' of module 95' may be set to provide indication by display 89 of postage of $1.17.

The user may be provided with a number of such boards 88 each marked, as at 98, with appropriate indicia for signifying the class of service or shipment mode for which calculation is to be determined and with the projections 93 and 93' being arranged appropriately for providing bit encoding to establish the appropriate calculations for proper display by weight display 20 and postage display 89. Devices 36 (FIG. 7), as suitably relocated, may be used to detect the presence or absence of projections 93, 93' for carrying out the rate selection step 79 to select information from tables 76 during the calculation mode.

The user, desiring to change from one mode of service to another, may accordingly withdraw one logic rate card board 88 and replace it with another of the desired category or mode or shipment or service, whereupon the weight display will be correctly formatted and postage or other cost will be correctly displayed, as in dollars and cents as by display 89. Also, the user is provided with the convenience and advantage of being able to reset the costs for postage or shipping increments when they change, rather than needing to purchase a new circuit board or have same updated by the manufacturer.

Thus, it will be manifest that each such circuit board 88, like each logic rate card 12, constitutes an encoded selection device which is readily usable with, and replaceable with respect to, the scale enclosure, permitting ready selection of a desired postage or shipping rate or the like by the user such as will establish a predetermined rate schedule or structure appropriate to the items to be weighed, whether such be first class mail, packages, or whatever. Each such device can be quickly inserted as the user desires to change from one type of item to be weighed to another.

The entire design of the new scale is intended to free the user from difficult adjustments, changes or other updating which would ordinarily require replacement of components (such as memory devices) by the manufacturer or distributor. But the design is also one carefully chosen to facilitate original manufacture and the determination of proper operation before reaching the ultimate user.

For the purposes of testing proper operation, a test algorithm is incorporated in the processing method. Referring to FIG. 7, the test algorithm 100 receives the 16-bit data from the averaging algorithm when appropriately signalled, causing this data to be converted to hexadecimal form for direct display of the weight data, following BCD-to-serial conversion in step 81, but without first undergoing processing by the zeroing or scale algorithm. In this way, the weight data is directly displayed by display 82 to allow proper calibration and checking during manufacture or subsequently should service be required. This also permits determination that a proper range of weight values will be provided during conversion 65 to be adequately processed and displayed. Of course, the direct display of the raw weight data will also permit linearity and ultimate accuracy to be checked at any time. Those skilled in the art will be able to employ this feature in connection with the new scale and, accordingly, the details of algorithm 100 are not, per se, described.

Although the foregoing includes a description of the best mode contemplated for carrying out the invention, various modifications are contemplated.

As various modifications could be made in the constructions herein described and illustrated without departing from the scope of the invention, it is intended that all matter contained in the foregoing description or shown in the accompanying drawings shall be interpreted as illustrative rather than limiting.

What is claimed is:

1. In combination, an electronic scale having weighing means and rate computing means for providing calculated weight and rate displays, and an encoded card-like rate selection and display device for providing combined front panel display and rate selection and readily and selectively usable with, and replaceable with respect to, said scale for causing said scale to provide calculated front panel weight and rate display only in accordance with predetermined encoding of said rate selection and display device, said scale having a front panel, said rate selection and display device being receivable upon said front panel and removable therefrom for changing, thereby to both the front panel display and rate selection to be changed simultaneously by changing of said rate selection and display device.

2. In combination, an electronic scale having weighing means and rate computing means for providing calculated weight and rate displays, and an encoded rate selection device readily and selectively usable with, and replaceable with respect to, said scale for causing said scale to provide calculated weight and rate display only in accordance with predetermined encoding of said device, said enclosure including a front panel, said device being of card-like form and receivable upon said front panel, the encoding of said device causing said scale to provide display of the weight upon said scale in predetermined increments established by the encoding of said device and to display the cost of postage or shipping of such items according to an encoded rate structure established by the encoding of said device, said scale including a display array of indicating devices for providing a sequential display of signals indicative of incremental increase in the cost of postage or shipping, said card signifying the actual cost for each of incremental segments of postage or shipping costs.

3. In combination, an electronic scale having weighing means and rate computing means for providing calculated weight and rate displays, and an encoded rate selection device readily and selectively usable with, and replaceable with respect to, said scale for causing said scale to provide calculated weight and rate display only in accordance with predetermined encoding of said device, said enclosure including a front panel, said device being of card-like form and receivable upon said front panel, said device being in the form of a circuit board of programmable nature, said enclosure including means for removably receiving said circuit board.

4. The combination according to claim 3 and further characterized by the encoding of said device causing said scale to provide display of the weight upon said scale in predetermined increments established by the encoding of said device and to display the cost of postage or shipping of such items according to an encoded rate structure established by the encoding of said device.

5. The combination according to claim 4 and further characterized by said circuit board having a plurality of switching devices for allowing user preselection of rate data to be utilized by computing means of said scale for providing said calculated weight and rate displays.

6. The combination according to claim 5 and further characterized by said circuit board having bit encoding along marginal portions thereof in the form of projections extending from said card in a predetermined pattern, said decoding means being responsive to the presence or absence of said projections according to said pattern.

7. An electronic scale for computing postage and shipping rates and the like comprising an enclosure having a weighing platform, a weight sensor for providing an analog signal which is a function of the weight of items upon the platform, means for converting the analog signal to a digital signal, and computing circuitry for computing weight and rate signals responsive to the digital signal, weight and rate displays for displaying weight and rate data according to the weight and rate signals, respectively, and characterized by an encoded rate selection device which is readily and selectively usable with, and replaceable with respect to, said enclosure for allowing ready selection of a desired postage or shipping rate or the like by the user, said selection device being encoded for a predetermined postage or shipping rate or the like, and detector means for decoding the encoding of said rate selection device and for causing said computing circuitry to compute the weight and rate signals according to said predetermined postage or shipping rate or the like, said rate selection device being encoded for causing said detector means to cause said computing circuitry to compute weight and rate signals according to only a predetermined rate structure, said computing circuitry causing display of weight of items upon the platform in predetermined increments to which said rate structure corresponds and for causing display of actual costs of postage or shipping rates for such items based upon said rate structure, said weight display comprising a digital readout device, said rate display including a display array of indicating devices for providing a sequential display of signals indicative of incremental increase in said costs.

8. An electronic scale according to claim 7 and further characterized by said rate selection device being of card-like form and receivable upon a front panel of said enclosure, said device carrying indicia for illumination by indicating devices of said display array.

9. An electronic scale according to claim 8 and further characterized by said device having a plurality of light transmissive areas and indicia adjacent to said light transmissive areas and conveying information of the actual costs of postage or shipping rates when signified by said devices through said light transmissive areas.

10. An electronic scale according to claim 9 and further characterized by said light transmissive areas being apertures for receiving corresponding ones of said indicating devices.

11. An electronic scale according to claim 9 and further characterized by said light transmissive areas being of film character and carrying said indicia thereon for being illuminated from below by corresponding ones of said indicating devices.

12. An electronic scale for computing postage and shipping rates and the like comprising an enclosure having a weighing platform, a weight sensor for providing an analog signal which is a function of the weight of items upon the platform, means for converting the analog signal to a digital signal, and computing circuitry for computing weight and rate signals responsive to the digital signal, weight and rate displays for displaying weight and rate data according to the weight and rate signals, respectively, and characterized by an encoded rate selection device which is readily and selectively usable with, and replaceable with respect to, said enclosure for allowing ready selection of a desired postage or shipping rate or the like by the user, said selection device being encoded for a predetermined postage or shipping rate or the like, and detector means for decoding the encoding of said rate selection device and for causing said computing circuitry to compute the weight and rate signals according to said predetermined postage or shipping rate or the like, the encoding of said rate selection device causing said detector means to cause said computing circuitry to compute weight and rate signals according to only a predetermined rate structure, said computing circuitry causing display of weight of items upon the platform in predetermined increments to which said rate structure corresponds and for causing display of actual costs of postage or shipping rates for such items based upon said rate structure, said computing circuitry comprising a microprocessor and a programmable memory, said memory having table-form stored data arranged in different blocks representative of different postage or shipping rates, said detector means including rate selection circuitry for selecting different ones of said blocks of data for processing by said microprocessor according to the predetermined postage or shipping rate for which said selection device is encoded.

13. An electronic scale according to claim 12 and further characterized by said different blocks of stored data defining different weight breakpoints for causing display of weight of items upon the platform in said predetermined increments.

14. An electronic scale according to claim 13 and further characterized by said different blocks of stored data defining different mathematical factors for causing scaling and factoring of weight data by said microprocessor to produce display of the actual monetary cost for postage or shipping of said items.

15. An electronic scale for computing postage and shipping rates and the like comprising an enclosure having a weighing platform, a weight sensor for providing an analog signal which is a function of the weight of items upon the platform, means for converting the analog signal to a digital signal, and computing circuitry for computing weight and rate signals responsive to the digital signal according to a predetermined rate structure, weight and rate display means for displaying weight and rate data according to the weight and rate signals, respectively, said display means being characterized by a front panel display card including an array of individual indicia providing a sequential serial format display of at least individual actual postage or shipping costs corresponding to the weight of items upon the platform according to said predetermined rate structure, and a corresponding array of light transmissive means respectively associated with the array of individual indicia for illuminating the respective indicia incrementally in arrayed sequence for thereby sequentially and incrementally conveying information of such actual costs to the user.

* * * * *